(12) United States Patent
Ahumada

(10) Patent No.: US 8,664,153 B1
(45) Date of Patent: Mar. 4, 2014

(54) ACTIVATED CARBON AS AN ADSORBENT COMPOSITION

(71) Applicant: Eduardo Ahumada, Coronel (CL)

(72) Inventor: Eduardo Ahumada, Coronel (CL)

(73) Assignee: Sociedad Oxidquimica Limitada, Coronel, VIII Region (CL)

( * ) Notice: Subject to any disclaimer, the term of this patent is extended or adjusted under 35 U.S.C. 154(b) by 0 days.

(21) Appl. No.: 13/901,208

(22) Filed: May 23, 2013

Related U.S. Application Data

(60) Provisional application No. 61/790,987, filed on Mar. 15, 2013.

(51) Int. Cl.
*B01J 20/20* (2006.01)

(52) U.S. Cl.
USPC .............................. 502/406; 502/401; 502/417

(58) Field of Classification Search
USPC ......................................... 502/401, 406, 417
See application file for complete search history.

(56) References Cited

U.S. PATENT DOCUMENTS

| | | | |
|---|---|---|---|
| 3,037,894 A | 6/1962 | Doan | |
| 3,957,059 A | 5/1976 | Rainer et al. | |
| 4,201,751 A * | 5/1980 | Holter et al. | 502/405 |
| 4,737,173 A | 4/1988 | Kudirka et al. | |
| 4,875,899 A | 10/1989 | Holtermann | |
| 4,906,398 A | 3/1990 | Alvarez et al. | |
| 5,212,131 A | 5/1993 | Belding | |
| 5,416,060 A | 5/1995 | Yamamoto | |
| 5,464,598 A | 11/1995 | Klatte | |
| 5,830,414 A | 11/1998 | Ishii et al. | |
| 5,942,323 A | 8/1999 | England | |
| 6,004,522 A | 12/1999 | England | |
| 6,319,307 B1 | 11/2001 | Shanks et al. | |
| 6,630,016 B2 | 10/2003 | Koslow | |
| 6,840,986 B1 | 1/2005 | Koslow | |
| 6,986,806 B2 | 1/2006 | Kvietok et al. | |
| 7,311,752 B2 | 12/2007 | Tepper et al. | |
| 7,371,270 B2 | 5/2008 | Smith et al. | |
| 7,378,372 B2 | 5/2008 | Sylvester | |
| 7,998,259 B2 | 8/2011 | Vijayakumar | |
| 2005/0098495 A1 | 5/2005 | Hughes | |
| 2005/0129914 A1 | 6/2005 | Rim et al. | |
| 2006/0070523 A1 | 4/2006 | Magargee et al. | |
| 2008/0236389 A1 | 10/2008 | Leedy et al. | |
| 2012/0157810 A1 | 6/2012 | Doerr et al. | |

FOREIGN PATENT DOCUMENTS

| | | |
|---|---|---|
| CL | 200901573 A | 2/2010 |
| EP | 0070523 B1 | 1/1983 |
| EP | 0071533 A2 | 2/1983 |
| EP | 0311454 A1 | 4/1989 |
| EP | 0635219 A1 | 1/1995 |
| EP | 1251884 B1 | 10/2002 |
| ES | 0480710 A1 | 5/1979 |
| ES | 2006735 A6 | 3/1987 |
| ES | 2000064 A6 | 11/1987 |
| ES | 2005477 A6 | 12/1987 |
| ES | 2129312 A1 | 2/1996 |
| GB | 2210806 A | 6/1989 |
| JP | 2003135579 A | 5/2003 |

OTHER PUBLICATIONS

Regen, S. L. et al. Activation through impregnation. Permanganate-coated solid supports. J. Am. Chem. Soc., 1977, 99 (11), pp. 3837-3838.

Tercio, J. et al. Carbon-carbon double bond cleavage using solid-supported potassium permanaganate on silica gel. J. Org. Chem., 1987, 52 (16), pp. 3698-3699.

Baskaran, S. et al. Heterogeneous permanganate oxidations: an improved procedure for the direct conversion of olefins to .alpha.-diketones/.alpha.-hydroxy ketones. J. Org. Chem., 1989, 54 (21), pp. 5182-5184.

Zhang, K. et al. Adsorption of permanganate onto activated carbon particles. Hua Xi Yi Ke Da Xue Xue Bao. Sep. 1997; 28(3):344-6.

Henning, K.-D. Impregnated activated carbon for environmental protection. Gas Separation & Purification DOI:10.1016/0950-4214(93)80023-P pp. 235-240.

Scott, K. J. et al. The Use of Polyethylene Bags and Ethylene Absorbent to Extend the Life of Kiwifruit (Actinidia Chinensis Planch) During Cool Storage. The Journal of Horticultural Science & Biotechnology, vol. 59 No. 4, pp. 563-566.

Charlot, G. Les Méthodes de la chimie analytique : Analyse quantitative minérale (4th Ed.). Paris 1961, p. 786.

* cited by examiner

*Primary Examiner* — Stuart Hendrickson
(74) *Attorney, Agent, or Firm* — Burns & Levinson LLP

(57) ABSTRACT

The present teachings relate to processes to impregnate activated carbon derived from a vegetal source with permanganate and optionally, iron (III) oxide. The present teachings also include the adsorbent compositions resulting from such processes.

20 Claims, No Drawings

ACTIVATED CARBON AS AN ADSORBENT COMPOSITION

CROSS REFERENCE TO RELATED APPLICATIONS

This application claims priority to and the benefit of the filing date of U.S. Provisional Application Ser. No. 61/790,987, filed on Mar. 15, 2013, the entire disclosure of which is incorporated by reference herein.

BACKGROUND

The preparation and use of porous adsorbent solids, impregnated with oxidizing compounds such as permanganate of lithium, sodium, potassium, silver, magnesium or calcium for the removal of undesirable vapors and gases is widely known in the art.

However, there is a need to improve the properties and capacity of the state-of-the-art adsorbent compositions and products using such compositions, for example, air filters.

SUMMARY

A strategy for the removal of harmful vapors and gases in the environment can include the use of porous adsorbents impregnated with an oxidizing agent, to contact the impregnated adsorbent with the vapors or gases, which when spread inside porous adsorbents, would be oxidized by the oxidizing agent creating innocuous products. A reason to use porous adsorbents is because of the large superficial or surface area of the adsorbents. In other words, the larger the surface area of the adsorbent, the larger amount of active component(s), e.g., oxidizing agent(s), that can be impregnated thereon or therein, and thus, a lower amount of the adsorbent would be necessary for the removal of a given quantity of vapors and gases.

The direct usage of activated vegetal carbon, i.e., activated carbon derived from a vegetal source, as an adsorbent impregnated with a salt of permanganate has not been reported despite activated vegetal carbon being a porous adsorbent with one of the largest superficial area ever known, for example, in some cases over 1500 $m^2/g$. One reason for lack of attention to activated vegetal carbon could lie in the fact that before the present teachings, it was not possible to impregnate activated vegetal carbon with permanganate, because the compound is a strong oxidizer and during the process of impregnation, will react with the surface of the activated vegetal carbon, specifically on the surfaces of the pores, reducing and adsorbing the reaction products.

It has been discovered that when the activated vegetal carbon first is contacted with a long chain saturated aliphatic hydrocarbon, such as petrolatum, (also referred to herein as a ("solvent for inertization") and then applying a vacuum, an "inert" activated vegetal carbon can be obtained. Subsequently, the inert activated vegetal carbon can be filtered and dried to eliminate the excess solvent of inertization and then contacted with a permanganate solution. Following further processing, an activated vegetal carbon impregnated with permanganate is realized. Moreover, in certain processes of the present teaching, permanganate is used to facilitate impregnation of iron (III) oxide in an activated vegetal carbon followed by impregnation of permanganate using a long chain saturated aliphatic hydrocarbon to provide an activated vegetal carbon impregnated with permanganate and iron (III) oxide.

Accordingly, the present teachings relate to processes to impregnate activated vegetal carbon with permanganate and optionally, iron (III) oxide. The present teachings also include the adsorbent compositions resulting from such processes. The adsorbent compositions can include a filter material impregnated with the activated vegetal carbon, which is impregnated with permanganate and optionally, iron (III) oxide. The adsorbent compositions of the present teachings can be useful to remove harmful vapors and gases such as amines, mercaptan, hydrogen sulphide, and ketones, as well as malodors associated with and/or created by bacteria, fungi, and the like. The adsorbent compositions described herein can be particularly useful for the removal of ethylene from places where fruits and other horticulture products are found and/or stored. In addition, the adsorbent compositions can be incorporated into different formats, for example, into air filters for refrigerators, air conditioners, filter screens, filters for refrigerated containers, and the like.

Accordingly, in one aspect, the present teachings provide adsorbent compositions. An adsorbent composition generally includes an activated carbon impregnated with at least a long chain saturated aliphatic hydrocarbon and permanganate, where the activated carbon is derived from a vegetal source. The adsorbent compounds of the present teachings also can include the activated carbon impregnated with iron (III) oxide.

In various embodiments, the activated carbon is derived from coconut shells. In some embodiments, the permanganate is present in an amount at least about 10 wt %, or in an amount at least about 20 wt % of the total weight of the adsorbent composition. In certain embodiments, the long chain saturated aliphatic hydrocarbon, for example, petrolatum, is present in an amount at least about 0.3 wt % of the total weight of the adsorbent composition. In particular embodiments, the adsorbent composition can be included in an article of manufacture such as an air filter or other structure that can contain the adsorbent composition and permit the flow of air therethrough.

In another aspect, the present teachings include methods of making an adsorbent composition. Methods of making a permanganate-loaded activated vegetal carbon generally include contacting an activated vegetal carbon with a long chain saturated aliphatic hydrocarbon. The methods can include applying a vacuum to the activated carbon and the long chain saturated aliphatic hydrocarbon to provide an "inert vegetal activated carbon." The methods can include contacting the inert vegetal activated carbon with an aqueous solution of a salt of permanganate. The methods also can include drying the resulting permanganate-containing solution to provide an adsorbent composition including an activated vegetal carbon impregnated with at least a long chain saturated aliphatic hydrocarbon and permanganate.

In some embodiments, applying a vacuum is continued until the activated carbon and the long chain saturated aliphatic hydrocarbon remain at a substantially constant mass. In certain embodiments, applying a vacuum is continued until the activated carbon and the long chain saturated aliphatic hydrocarbon have a water content of equal to or less than about 10 wt % of the total weight of the activated carbon and the long chain saturated aliphatic hydrocarbon.

In various embodiments, the aqueous solution of a salt of permanganate is acidic, for example, by including sulfuric acid in the aqueous solution. In particular embodiments, the sulfuric acid is present in an amount between about 0.1 wt % to about 1 wt % of the total weight of the solution. In some embodiments, contacting the inert vegetal activated carbon with an aqueous solution of a salt of permanganate includes heating to a temperature between about 70° C. to about 110° C.

In certain embodiments, drying the resulting solution comprises at least one of rotating the solution and using hot air such as from fans or blowers, for example, counter-current dryers. The methods of the present teaching also can include separating non-impregnated salts of permanganate and other loose solids from the adsorbent composition. Methods of separating can include at least one of shaking and filtering such as with the use of a sieve.

In particular embodiments of the present teachings, methods of making a permanganate-and iron (III) oxide-loaded activated vegetal carbon, which can be associated with a filter material, such as those including a polyester, generally include adding an acidic solution of a salt of permanganate to a filter material impregnated with an activated carbon derived from a vegetal source and adding an aqueous mixture of an iron salt. The methods can include drying the filter material comprising the activated carbon and the product(s) of contacting the activated carbon with the salt of permanganate and the iron salt. The methods can include contacting the dried filter material with an emulsion of an aqueous solution of a salt of permanganate and a long chain saturated aliphatic hydrocarbon. The methods also can include drying the resulting filter material to provide an adsorbent composition comprising an activated carbon impregnated with at least a long chain saturated aliphatic hydrocarbon, permanganate, and iron (III) oxide, where the activated carbon is derived from a vegetal source.

In various embodiments of making such an adsorbent composition, contacting the dried filter material with an emulsion after treatment of the filter material with an acidic solution of a salt of permanganate and an aqueous mixture of an iron salt includes spraying the emulsion of an aqueous solution of a salt of permanganate and a long chain saturated aliphatic hydrocarbon on the dried filter material. In some embodiments, drying the resulting filter material after contact with the emulsion includes using at least one of infrared radiation and air, such as blown and/or hot air.

In certain embodiments where iron (III) oxide is impregnated, the iron salt used in the methods includes an iron (II) salt, such as iron sulfate.

In any of the methods described herein, the vegetal source of the activated carbon can be coconut shells; the long chain saturated aliphatic hydrocarbon can be selected from petrolatum, liquid petrolatum, mineral oil, and combinations thereof; and/or the salt of permanganate can be selected from potassium permanganate, sodium permanganate, lithium permanganate, and combinations thereof. In particular embodiments of the methods, the adsorbent composition can be placed into a container, for example, a porous container.

The foregoing as well as other features and advantages of the present teachings will be more fully understood from the following description, examples, and claims.

DETAILED DESCRIPTION

The present teachings relate to an adsorbent composition that can be included in a filter medium, where the adsorbent composition includes activated carbon derived from a vegetal source, and the activated vegetal carbon is impregnated with permanganate and optionally, iron (III) oxide ("$Fe_2O_3$"). The present teachings also relate to the methods of fabricating such an adsorbent composition. The adsorbent compositions of the present teachings can be useful in the removal of smells, vapors, and harmful gases such as amines, mercaptan, hydrogen sulfate, sulphur dioxide, tarns, nitrogen dioxide, alcohols, aldehydes, and ketones, as well as from the deterioration of bacteria and fungi that can be found in refrigerated systems where fruit, horticultural, and other nondurable food products can be stored. The adsorbent compositions of the present teachings also can be used in connection with storehouses, air conditioner and air acclimatization equipment, and air purification systems.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should he understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

At various places in the present specification, substituents are disclosed in groups or in ranges. It is specifically intended that the description include each and every individual subcombination of the members of such groups and ranges. By way of example, an integer in the range of 0 to 40 is specifically intended to individually disclose 0, 1, 2, 3, 4, 5, 6, 7, 8, 9, 10 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

It should be understood that the order of steps or order for performing certain actions is immaterial so long as the present teachings remain operable. Moreover, two or more steps or actions may be conducted simultaneously.

As used herein, an "activated carbon derived from a vegetal source" or "activated vegetal carbon" (used interchangeably herein) (or similar terminology) refers to an activated carbon derived from a natural vegetal source such as from coconut shells, hardwood, softwood, fruit pits, and the like. The activated carbon of the present teachings can be derived from other natural (vegetal) sources. The activated carbon of the present teachings can be in the form of granules, powder, pelletized, or fibers, or such a form impregnated in a fiber or fiber material. The activated carbon can have a surface area of at least about 800 $m^2/g$, at least about 1000 $m^2/g$, or at least about 1200 $m^2/g$. The activated carbon can have a porosity volume of least about 0.15 $cm^3/g$, at least about 0.2 $cm^3/g$, at least about 0.25 $cm^3/g$, or at least about 0.3 $cm^3/g$.

The process of obtaining activated carbon from these vegetal sources or any other origin involves in one stage of controlled carbonization of the raw material, followed by a physical activation of the carbon with water vapor or carbon dioxide, or chemical activation using dehydrating agents such as anhydrous sodium chloride or phosphoric acid. During the stage of activation, different techniques are used to the control of the size of the pores and their wall structure. However, the use of different techniques to produce activated vegetal carbon does not affect the practice of the present teachings.

As used herein, "superficial area" or "surface area" is expressed in $m^2/g$ or any other appropriate unit of measure, which is an area divided by the unit of mass for which the area was measured. Measurement techniques can include the standard BET and the accumulative pore volume ($cm^3/g$) estimated through mercury porosimetry.

As used herein, a "long chain saturated aliphatic hydrocarbon" refers to a straight-chain or branched saturated hydrocarbon group having a long hydrocarbon chain that typically has more than 6 carbon atoms, for example, from 10 to 30 or more carbon atoms, or from 12 to 30 or more carbon atoms, from 16 to 30 or more carbon atoms, from 18 to 30 or more carbon atoms, from 20 to 30 or more carbon atoms, or from 24 to 30 or more carbon atoms. Examples of long chain saturated aliphatic hydrocarbon include petrolatum, which also is known as petroleum jelly, mineral jelly, white petrolatum, and soft paraffin (CAS No. 8009-03-8), for example, Vaseline™, liquid petrolatum, liquid paraffin, and mineral oil. Petrolatum can be a United States Pharmacopeia (UPS) grade, which means that it is suitable for cosmetic and personal care uses, (e.g., having a low content of aromatic compounds). It should be understood that when reference is made to a long chain saturated aliphatic hydrocarbon, one or more long chain saturated aliphatic hydrocarbons may be present or used in combination in the practice of the invention including in its resulting compositions.

As used herein, a "filter material" refers to any fibrous filter medium that can support or be impregnated by an activated carbon derived from a vegetal source. The filter material can include natural or synthetic fibers such as polyester, polyethylene, polypropylene, polycarbonate (optionally containing silica), mineral wool, ceramic fibers, glass fibers, and animal fibers.

As used herein, to "impregnate" refers to the filling or infusing of a material into, on or otherwise associated with another material. The term "impregnate" can be used interchangeably with "in contact with," "associated with," and "loaded with," particularly with respect to the permanganate and/or iron oxide relationship with the activated vegetal carbon of the present teachings. For example, impregnated materials can remain in contact with or associated with another material when subjected to mechanical separation processes, for example, sieving. It should be understood that while the common meaning of the term may be to saturate, soak or infuse, or to all throughout, as used herein the term is not meant to identify the quantity of material impregnated, but rather the location, site and/or positioning of the materials that are impregnated. Of course, outer surfaces of a porous material such as activated vegetal carbon also can be in contact with an impregnated material, for example, the outer surface can include the compound(s) that were impregnated in the pores of the porous material.

As used herein, a "container" refers to any structure that can contain the adsorbent compositions of the present teachings. Examples of containers include bags, envelopes, boxes, cartons, and the like. A container can be a porous container such that air can pass through the container and contact the adsorbent compositions of the present teachings.

The direct usage of activated carbon derived from a vegetal source as an adsorbent impregnated with a salt of permanganate has not been reported despite activated vegetal carbon being a porous adsorbent with one of the largest superficial area ever known, for example, in some cases over 1500 $m^2/g$. One reason for lack of attention to activated vegetal carbon could lie in the fact that before the present teachings, it was not possible to impregnate activated vegetal carbon with permanganate, because the compound is a strong oxidizer and during the process of impregnation, will react with the surface of the activated vegetal carbon, specifically on the surfaces of the pores, reducing and adsorbing the reaction products. Such action was reported by Zhang and his collaborators in 1997, (Zhaug K., Li, C., He, J., Liu, R. "*Adsorption of permanganate onto activated carbon particle*," Hua Xi Yi Ke DA Xue Xue Bao 1997 September; 28 (3): 344-6). In the same way, D. Henning and S. Schafër, Carbon Tech-Aktivkohien GmbH, Franz-Fischer-Weg 61, D-45307 Essen, report that, the impregnation of activated carbon with permanganate of potassium would turn activated carbon into manganese (IV) oxide ("$MnO_2$") that would be adsorbed on the surface of the activated carbon. Activated carbon containing the reduction products of permanganate lacks of the utility for the purposes of the present teachings, because the energy network of this solid is very high, so it does not react easily. Even though, it can be useful in other fields.

The procedure used in the state of art for the impregnation of porous adsorbents with salts of permanganate consists on the reducing the water content of the adsorbent through a process of dehydration until a value between about 5% to about 10%, or less. After the adsorbent is dehydrated, it is contacted with an aqueous solution or suspension of a salt of permanganate using its maximum solubility, or other similar oxidizing compounds that have cations like potassium, sodium or lithium, and the like. However, when this procedure is attempted with activated vegetal carbon, the salts of permanganate are reduced to $MnO_2$ as described above, instead of being adsorbed on the activated vegetal carbon. Example 1 demonstrates this process.

However, it has been discovered that when the activated vegetal carbon first is contacted with a long chain saturated aliphatic hydrocarbon, such as petrolatum, (also referred to herein as a "solvent for inertization") and then applying a vacuum, an "inert activated vegetal carbon" can be obtained. As used herein, "inert" refers to the lack of or low reactivity of the activated vegetal carbon surfaces with permanganate. Subsequently, the inert activated vegetal carbon can be filtered and dried to eliminate the excess solvent of inertization. The dried solids then can be contacted with a permanganate solution, as illustrated in Example 2. (It should be understood that when reference is made to "permanganate" herein, the reference can include a salt of permanganate unless otherwise stated or inferred from the context of its use.)

After the activated vegetal carbon has been impregnated with the permanganate solution as described herein, it can be filtered and dried under vacuum and/or heat, for example, about 70° C. to 100° C., to reduce the content of impregnation solvent and water until at least about 5% of the maximum consumed amount in the process (17% to 25%).

This process can result in an activated vegetal carbon impregnated with permanganate that can be used in the removal of undesirable vapors and gases in the environment, specially ethylene gas and its inclusion in the activated packing system of horticultural products. The product and solvent composition also can be packed in filter formats for refrigerators that maintain an environment free of ethylene to delay the maturation of these products, thereby reducing their deterioration during storing and transport.

In various embodiments, the activated vegetal carbon can be contacted, for example, mixed or soaked, with a long chain saturated aliphatic hydrocarbon that can saturate the activated carbon, allowing the penetration of the hydrocarbon molecules into the pores of the activated carbon. The activated carbon can consume up to about 17% of the long chain saturated aliphatic hydrocarbon. The contact between the activated vegetal carbon and a long chain saturated aliphatic hydrocarbon is made, preferably, by immersion of the activated carbon in the long chain saturated aliphatic hydrocarbon, and then applying a constant vacuum at ambient temperature.

To determine the amount of "inertization" with a long chain saturated aliphatic hydrocarbon, liquid petrolatum was added in determined intervals, the activated carbon was extracted from the container, material vacuum filter was applied to eliminate the excess long chain saturated aliphatic hydrocarbon, and the resulting material was weighted until a constant mass was obtained (e.g., when bubbles are not observed in the solution). The constant mass corresponds to the amount of inertization of the activated vegetal carbon or the maximum adsorbed amount of petrolatum by the activated vegetal carbon. Depending on the source and processing of the activated vegetal carbon, up to about 25 wt % of a long chain saturated aliphatic hydrocarbon such as petrolatum can be adsorbed by the activated vegetal carbon. This value can change because of the hydrophobic nature of the porous surfaces and also the distribution of the carbon pores. Accordingly, in various embodiments, the amount of long chain saturated aliphatic hydrocarbon adsorbed by the activated vegetal carbon can be up to about 5 wt %, to about 7 wt %, up to about 10 wt %, to about 15 wt %, or up to about 20 wt %, of the total weight of the materials. In the present teachings, "inert activated vegetal carbon" refers to an "activated vegetal carbon impregnated with a long chain saturated aliphatic hydrocarbon."

Next, the inert activated vegetal carbon is contacted with a saturated acidic solution of a salt of permanganate. In some embodiments, permanganate of potassium is dissolved in a aqueous solution of diluted sulphuric acid, for example, having between about 0.1 wt % to about 1 wt % of sulphuric acid. In particular embodiments, the ratio of the mass of permanganate to the mass of inert activated vegetal carbon in the created heterogenic mixture can vary between about 0.5 and about 1. In various embodiments, the ratio of the mass of inert activated vegetal carbon to the mass of the aqueous solution of sulfuric acid in the mixture can vary between about 5 and about 1.

The contact between the acidic solution of permanganate and the inert activated vegetal carbon can be carried on in any appropriate container, preferably with agitation. During the time of contact, the temperature of the mixture can be between about 20° C. to about 40° C. Without wishing to be bound to any particular theory, it is believed that during this period, the aqueous permanganate solution diffuses into the pores, where it mixes with the long chain saturated aliphatic hydrocarbon such as petrolatum. The long chain saturated aliphatic hydrocarbon typically is less dense than water and ascends to the surface, being eliminated from the inert activated vegetal carbon. However, not all the long chain saturated aliphatic hydrocarbon is eliminated from the inert activated vegetal carbon. Rather the long chain saturated aliphatic hydrocarbon that is in direct contact with the surface of the pores, which are more hydrophobic, remains and allows the acidic permanganate solution to be present within the inert activated vegetal carbon without any reaction. Afterwards the excess water and long chain saturated aliphatic hydrocarbon are removed, thereby impregnating the permanganate in or on the surfaces of the activated vegetal carbon. The impregnated activated vegetal carbon can be filtered through a sieve of a size appropriate to separate the excess, loose permanganate from the impregnated activated vegetal carbon. In some embodiments, percentage in weight of permanganate in an impregnated activated vegetal carbon can reach values up to about 10%. In certain embodiments, the amount of impregnated permanganate is greater than about 3 wt %, greater than about 5 wt %, greater than about 6 wt %, greater than about 7 wt %, greater than about 8 wt %, or greater than about 9 wt %.

The impregnated activated vegetal carbon with permanganate can be used in advantage, in systems of activated packing of horticultural products in filters for refrigerators, filtrating boxes with or without air suction, in bags, and the like, being its inclusion in the systems for the elimination of ethylene.

The ethylene is a vegetal hormone that causes aging in the vegetables tissues. It pays an important part in the taste improvement in the softening of tissues, and the fruits color increase. Ethylene also interferes in a series of physiologic process in plants during its growing, development and death. In close environments or without ventilation like packing for storing and packing, the accumulation of ethylene from some fruits horticultural products sensitive to ethylene may cause a vast amount of damage such as softening and accelerated decomposition. In the fruit horticultural numerous measurements of removal have been developed to minimize the levels of ethylene during storage and transport of the fruits horticultural products. One of them, is the application of programs of ventilation and purification of air throughout a forced ventilation, controlled atmosphere, modified atmospheres, thermo removal equipment that contain permanganate of potassium one the ones that contain porous solids without impregnate., semiconductors solids and modification of the metabolism of the fruit by the introduction of chemical compounds such as 1-methilciclopropene, (1MCP). All these measurements indicate to adsorb ethylene, and in some cases to oxide it turning it into ethylene glycol and then to water and carbon dioxide.

In this state of arts, there are many adsorbent and removal commercial products which use activated alumina or impregnated zeolite with permanganate. These products in envelopes or sachets, containing a determined amount of impregnate adsorbent is place inside the boxes with the horticultural products which are sensitive to ethylene. The adsorbent compositions of the present teachings can be used in the same way.

For example, containers or envelopes can be made of microfibers of polyethylene of high density, which are permeable to gases like ethylene and carbon dioxide, but not very permeable to water. Other materials for envelopes containing ethylene removals include polystyrene, polypropylene, polycarbonate that contains silica. Any of these materials and combinations thereof can be used wit the adsorbent compositions of the present teachings.

Activated vegetal carbon impregnated with permanganate has a high capacity to remove ethylene. Accordingly, such a composition can be used advantageously to remove ethylene generated by some fruit horticultural products is close environments. For this purpose, activated vegetal carbon impregnated with permanganate, in bulk, in bags, or sachets permeable to ethylene, containing a determined amount of this impregnated activated vegetal carbon can be placed inside the packaging that contains the fruit and horticultural that is sensitive to ethylene, for example apples, apricots, avocados, kiwis, tomatoes, melons, watermelons, peaches, pears, quince, plums, cherimoyas, nectarines, broccolis, flower bulbs, roses, and many other products.

The effective amount of impregnated activated vegetal carbon needed for a right protection for packed horticultural products could be easily determined by a person normally well versed in the material, having in mind the quantity and type of product that you need to keep in a ethylene free atmosphere, the volume table of the space, the temperature and the period of time during is needed to keep this atmosphere, and the specific velocities of generation of ethylene in function of the temperature, that is known for most of the horticultural products and on the other hand, easily to measure by a normal well versed person in the material, all this together with the knowledge of the adsorption characteristic of the products published in the state of art.

An exemplary production process is described next. An exemplary process starts with the selection of the size of the commercial activated carbon grain, using an electro-mechanic sieve that separates the finest fraction of the material, which is classified under 200 mesh, and reaches a percentage of about 0.5% and 2.5%. The larger fractions, for example, over 200 mesh in size, are taken to a reactor that can be stainless steel, plastic, fiber, glass or glass. Through a spinner bomb and from a pond. Petrolatum is added in an amount that is 2 to 10 compared in proportion to the activated vegetal carbon mass. Vacuum is applied to degasify the activated vegetal carbon to replace the air inside the pores with liquid petrolatum during a 10 to 60 minute time period, or until the bubbles disappear in the reactor. The resulting mixture is vacuum filtered using a filter. The recovered petrolatum can reach about 83% and can be sent back to the pond for reuse. The solid materials is taken to a soli-liquid complete mixer reactor, and in some cases dried when required. Next, a permanganate of potassium acidic solution from the pond is incorporated. The mixture is shaken for 60 to 120 minutes, and vacuum filtered in the filter, thereby recovering part of the permanganate of potassium solution. The solid materials of the treated activated vegetal carbon are dried in a rotating drier that can use hot air provided by the combustion of a liquated gas source or any other similar apparatus. After the solid mixture is dried the permanganate of potassium powder that was not impregnated is separated with a tamizer (sieve) from the rest of the impregnated activated vegetal carbon product of interest. In this way, a uniform size of product (grains or particles) can be obtained. The product can possess from about up to about 5 wt %, up to about 10 wt %, or up to about 15 wt % of impregnated permanganate of potassium.

An important concept of the present teachings relates to the chemical and physical properties of the solid surfaces. In that respect, it is well known that solids, and especially activated vegetal carbon, have the ability to modify their surface properties and attract positive or negative electrical charge. The presence of one electronic state or the other is determined by environmental pH and the chemistry of the surface of the solid. In an environment pH, in its natural way, the surface has a determined isoelectric point. When the particle is in contact in an acid medium of pH less than the isoelectric point, the surface will be positively charged and will attract negatively charged particles (anions). If the environment around the particles has a pH greater than the isoelectric point, the surface will have a negative charge and attract positively charged particles (cations). Accordingly, the chemistry of the solid surface influences the value of the isoelectric point.

In this way, the oxidation of the activated vegetal carbon can play an important role in the adsorption of metals. It is known that oxidizing agents such as ammonium persulfate, nitric acid, hydrogen peroxide, permanganate of potassium, and the like can oxidize carbon surfaces to create carboxylic groups.

When salts of permanganate, for example, potassium permanganate, are in a very acid environment, they will be protonated and will give a positive charge to the surface. When the compounds are in a very basic or slightly acidic environment, they will be deprotonated and will give a negative charge. At the same time, other solids are able to acquire charge by the process of adsorption or another mechanism so such is the case of Mn (IV) hydrate and iron (III) hydroxide, $Fe(OH)_3$, in a aqueous medium. Without wishing to be bound to any particular theory, it is believed that the surfaces of the finely divided solids tend to have an excess of superficial energy due to an unbalance in the chemical forces among the atoms, ions, and/or superficial molecules. Manganese (IV) oxide precipitates and may achieve a superficial area that can reach hundreds of $m^2/g$. Accordingly, the process of hydration and later sorption of $H^+$ forms a positively charged Mn (IV) oxide hydrate molecule ("$MnO_2(H_3O)^+$").

These charged molecules could be adsorbed to the activated vegetal carbon surface that has been oxidized and which is in a pH environment larger than the isoelectric point as it will present a negative charge on its surface. In this respect, if permanganate of potassium is contacted with activated vegetal carbon, in any of their formats (powder, granular, and pellet), especially impregnated in polymeric materials in presence of salts of Fe (II), an activated carbon impregnated with manganese oxide (IV) and iron (III) results, as can be observed in Example 3. In other words, in a variation of the embodiments where the process impregnates permanganate alone, here the permanganate is used to modify the surface of the activated vegetal carbon to render it receptive to other materials and compounds, for example, iron (III) oxide.

Consequently, the production of an adsorbent composition including a filtering material such as unwoven polyester, impregnated with an activated vegetal carbon in which iron (III) oxide ($Fe_2O_3$) and permanganate of potassium ($KMnO_4$) are impregnated, can be a useful as or in a filtering device. Such an adsorbent composition can have utility in the areas of chemical and biological cleaning of housing and industrial airs, air acclimatization in buildings, clinics, hospitals, non-durable food preserving systems, flower maintenance, greenhouses improvement systems, air conditioners for the home and public places, elimination of $H_2S$ from industrial work, mining places, natural gas plant, elimination of nitric oxide from cigarettes, and the like.

In various embodiments, the methods of making a permanganate- and iron (III) oxide-loaded activated vegetal carbon generally can include adding an acidic solution of a salt of permanganate to a filter material impregnated with an activated vegetal carbon; adding an aqueous mixture of an iron (II) salt such as iron sulfate; subsequently drying the filter material comprising the activated carbon and the product(s) of reaction contained therein; contacting the dried filter material with an emulsion of an aqueous solution of a salt of permanganate and a long chain saturated aliphatic hydrocarbon; and drying the resulting filter material to provide an adsorbent composition comprising an activated vegetal carbon impregnated with at least a long chain saturated aliphatic hydrocarbon, permanganate, and iron (III) oxide.

In some embodiments of making such an adsorbent composition, contacting the dried filter material with an emulsion includes spraying the emulsion of an aqueous solution of a salt of permanganate and a long chain saturated aliphatic hydrocarbon on the dried filter material. In some embodiments, drying the resulting filter material after contact with the emulsion includes using at least one of infrared radiation and air such as hot air.

The adsorbent compositions that result from such processes include an activated vegetal carbon impregnated with permanganate and iron (III) oxide, where a filter material is impregnated with such impregnated activated vegetal carbon. In some embodiments, the weight percentage of permanganate in such an impregnated activated vegetal carbon can reach values up to about 20% or greater. In certain embodiments, the amount of impregnated permanganate is greater than about 5 wt %, greater than about 10 wt %, greater than about 12 wt %, greater than about 15 wt %, greater than about 17 wt %, or greater than about 25 wt %. The activated vegetal carbon also can include a long chain saturated aliphatic hydrocarbon. In various embodiments, the activated vegetal carbon can include $MnO_2$.

The following examples are provided to illustrate further and to facilitate the understanding of the present teachings and are not in any way intended to limit the invention.

EXAMPLE 1

Impregnation of Granular Activated Vegetal Carbon with Permanganate of Potassium 100 grams of granular activated carbon from coconut shells of the grain size 6×8, with about 6% moisture content, a pore volume of 0.15 $cm^3/g$ and an specific area of 1200 $m^2/g$, mixed in a 500 ml container containing 300 ml of water, 50 g of permanganate of potassium (p.a. Merck) and between 0.5 ml and 2 ml of a concentrated sulphuric acid (98% p/p and a density of 1.84 g/ml). The container was placed in a magnetic shaker (with agitation ~6) at room temperature. Subsequently, a part of the solid mixture was removed and the excess liquid was eliminated using a Buchner funnel. The solids were placed in a heater between 70° C. to 110° C. for one hour, resulting in a moisture content of about 7.8%. Afterwards, the solids were sieved (or tamized) through a 200 mesh sieve to remove the excess manganese compounds which did not impregnate the activated vegetal carbon as well as other loose solids.

Then samples of 0.4 grams were taken from the impregnated activate vegetal carbon and put in contact with 50 ml of distilled water in a 150 ml container, which was placed in an orbital shaker run at 200 rpm at room temperatures for one hour. Then, a 5 ml sample was taken and diluted to 25 ml in a capacity flask, and the concentration of the Mn (IV) and Mn (VII) was measured in the solution using molecular absorption spectrophotometry at wavelengths of 525 nm and 300 nm according to the methods described by Charlot. ("Les methodes de la Chemie analytique," Gaston Charlot, $4^{th}$ edition, 1961, PARIS (786)). The measurements were carried out using a Shimadzu UV Visible Spectrophotometer, Model 1603. The concentrations of permanganate Mn (VII) and manganese Mn (IV) compounds were determined to be 0.050 g/l and 0.791 g/l, respectively. From these concentrations, the number of grams of permanganate Mn (VII) and manganese Mn (IV) adsorbed by the activated vegetal carbon was determined to be 0.0125 g and 0.252 g, respectively. Accordingly, 95% of the impregnated manganese was in the reduced form of manganese (IV) and the percent of impregnation of permanganate Mn (VII) was only 4.6%.

EXAMPLE 2

Impregnation of Granular Activated Vegetal Carbon with Petrolatum and Permanganate of Potassium 100 grams of granular activated vegetal carbon from coconut shells as used in Example 1, was mixed with liquid petrolatum and a vacuum applied until a constant weight was achieved. After filtering the liquids and drying with vacuum filtration, the solid material (inert activated vegetal carbon) was added to a 500 ml container having 300 ml of water, 50 g permanganate of potassium, and about 2 ml of a concentration solution of sulphuric acid (99% p/p and a density of 1.84 g/ml) therein. The container was placed in a magnetic shaker (agitation ~6) and the mixture was shaken at room temperature for 60 minutes. Previous experience has shown that under the above conditions, the maximum amount of impregnated manganese usually is obtained in about 1 hour. However, contact between an inert activated vegetal carbon and the acid solution of permanganate can be maintained for longer periods of time, if necessary or desired. After 1 hour, the solid mixture was filtered with a Buchner funnel to remove excess solution.

The resultant solids (activated vegetal carbon impregnated with petrolatum and permanganate) were placed in a stove between 70° C. and 110° C. for one hour. Subsequently, the dried solids were passed through a 200 mesh sieve to remove compounds of manganese that did not impregnate the activated vegetal carbon as well as other loose solids. The resultant moisture content of the activated vegetal carbon was between 7.5% and 7.8%.

Each of seven samples of 0.7 g was mixed with 50 ml of distilled water in 50 ml Erlenmeyer flasks with lids in an orbital agitator at 200 rpm and room temperature. After 5 minutes, a sample of 5 ml was taken from one of the seven flasks. The sample was diluted to 25 ml in a quantity flask. The concentration of manganese (IV) and manganese (VII) was measured in that solution using molecular absorption spectrophotometry as described in Example 1. After 10 minutes, the same procedure was repeated with a second flask and from this flask, a second sample was obtained, and so on and so forth until completing 70 minutes of agitation. The concentration of manganese compounds for each of the seven samples is shown in Table 1.

As can be seen in Table 1, for agitation up to 10 minutes, the concentration of permanganate of potassium does not change substantially, which suggests that only the permanganate of potassium that is impregnated on the activated vegetal carbon surface was dissolved into the solution. After 10 minutes, it can be observed that the permanganate of potassium that was impregnated in the pores of the activated vegetal carbon began to leach out and dissolve in the solution. After about 60 minutes, the amount of dissolved permanganate in the solution appeared to reach its greatest concentration. In contrast, for up to one hour, the presence of manganese (IV) oxide was not observed, which suggests that the formation of manganese (IV) occurred only in the smallest pores. The maximum values of concentration of manganese compounds obtained in this example were 0.455 g/l of Mn (VII) and 0.00035 g/l of compounds of Mn (IV). From these concentrations, it was determined that the amounts of manganese (VII) and manganese (IV) compounds that were present in the activated vegetal carbon were 0.1138 g and 0.000875 g, respectively. These results demonstrate that nearly 100% of the impregnated manganese was present as Mn (VII) and practically no Mn (IV) was impregnated. Moreover, the percentage of permanganate Mn (VII) impregnated in the activated vegetal carbon was over 16%. Such a result was unexpected in the light of the known techniques for impregnating permanganate in activated (vegetal) carbon.

TABLE 1

Concentration of Manganese Compounds in 50 ml of Water Containing 0.7 g of Saturated Granular Vegetal Activated Carbon Impregnated with Petrolatum and Potassium Permanganate for Different Times.

| Sample | time (min) | g/l (25 ml) | g/l (50 ml) | g Mn (VII) | g/l (25 ml) | g/l (50 ml) | g Mn (IV) | % KMnO$_4$ | % MnO$_2$ |
|---|---|---|---|---|---|---|---|---|---|
| 1 | 5 | 0.067 | 0.335 | 0.0168 | 0 | 0 | 0 | 2.4 | 0 |
| 2 | 10 | 0.072 | 0.360 | 0.0180 | 0 | 0 | 0 | 2.6 | 0 |
| 3 | 22 | 0.13 | 0.650 | 0.0325 | 0 | 0 | 0 | 4.6 | 0 |
| 4 | 30 | 0.284 | 1.420 | 0.0710 | 0 | 0 | 0 | 10.1 | 0 |
| 5 | 45 | 0.36 | 1.800 | 0.0900 | 0 | 0 | 0 | 12.9 | 0 |
| 6 | 60 | 0.453 | 2.265 | 0.1133 | 0 | 0 | 0 | 16.2 | 0 |
| 7 | 70 | 0.455 | 2.275 | 0.1138 | 0.00035 | 0.00175 | 0.0000875 | 16.3 | 0.0125 |

EXAMPLE 3

Impregnation of Activated Vegetal Carbon with Permanganate of Potassium and Iron (III) Oxide For this example, a filter material of non-woven polyester of 5.5 mm (±1 mm) thickness was impregnated with about 24% activated vegetal carbon from coconut shells. Rolls of 340 mm width×8000 mm length were formed with this impregnated filter material. In a 25 l stainless steel reactor, one roll of approximately 40 cm in diameter was placed into contact with a solution of between 14 kg and 40 kg of permanganate of sodium, 300 g to 1000 g of concentrated sulphuric acid, and 300 l to 500 l of water. The roll was kept in the reactor, agitated with steel disc agitator at a constant speed between 200 to 500 rpm for 1 to 3 hours. The temperature reached between 20° C. to 40° C. After about 20 to 40 minutes of reaction, a liter of 10% heptahydrate iron (II) sulfate (Fe(SO$_4$).7 H$_2$O) solution was added. (It should be noted that when the reaction started, the pH was between 1 and 3, and when the reactor ended the pH was between 5 and 7, with a dark green and brown colored product.) Subsequently, the roll was spin-dried and separated from the reaction products using an appropriate sized spin-dryer.

Afterwards, impregnation of permanganate was carried out using an aerosol and infrared radiation drier, i.e., a pressurized spray system and a horizontal drier with a conveyor belt and emission plate of infrared radiation. A heat source was used because it is well known that this kind of activated permanganate can absorb efficiently this type of radiation, allowing the heat transfer to the outside, from the inner part of the particle to the outer part of the solid.

The spin-dried roll was positioned on a conveyor belt that moves between 1 to 3 m/min speed and goes through a pressurized dosage camera where an aerosolized solution of permanganate of potassium of concentration like the solution used in the reactor is sprayed using a mouthpiece with an angle that covers the whole fiber width. After that, the roll continues on the conveyer belt to the drier, which has emission lamps of infrared heat, reaching temperatures between about 80° C. and 150° C., and in the output, a ventilator that provides a cross-current of air. Because of the materials used, it is possible to carry out this process on both faces of the blanket, and it can be used more than once, if necessary.

After the process is finished, samples of one meter through the whole fiber were taken. Sections of 250 mm in four zones of each meter were cut. Then, a central part of each of the four sections was taken and a 20 mm width×150 mm length band was extracted to be analyzed. The average weight of the sample bands was close to 1.5 grams. Each sample band was put in contact with 45 ml of distilled water in a 150 ml container for 1 hour; then agitated with an orbital agitator at 200 rpm. Afterwards, the supernatant was filtered using Whatman filter paper, and then poured into a 250 ml Erlenmeyer flask. Molecular absorption spectrophotonietry at a wavelength of 525 nm was used to determine the concentration of permanganate by the method of Charlot, as referenced previously herein. The same referenced Shimadzu spectrophotometer also was used.

For this example, the results showed an average concentration of 0.44 g/l of MnO$_4$ which is 0.0044 g of MnO$_4$ and a total of 0.0196 grams of KMnO$_4$ in the 45 ml, giving a percent of impregnation of KMnO$_4$ close to 1.3%.

The iron (III) oxide was qualitatively determined, because it is more difficult to separate and quantitatively measure the amount of iron (III) oxide present with MnO$_2$. For the iron analyses, the analyzed bands were cut into two. One of them was put in contact with 100 ml of water in an 250 ml Erlenmeyer flask and droplets of HCl at pH of about 1 and thiocynate of potassium (KSCN) were added. The red blood colored solution confirmed the presence of Fe (III). The other sub sample was placed into contact in the same way, but HCl was not added. In this case, there was no evidence of the red blood color of thiocyanate and Fe (III). Accordingly, it is inferred that the iron species was Fe$_2$O$_3$.

The individual results are shown in Table 2. Although it is very unlikely that the surface of activated vegetal carbon will adsorb permanganate of potassium, the low measured values likely are the result of the difference between the velocity of the process of impregnation by aerosol and drying by infrared radiation versus the velocity of the reaction of permanganate and activated vegetal carbon. Nevertheless, even when the process of impregnation is almost instantaneous, the reaction of activated vegetal carbon with permanganate will happen anyway.

TABLE 2

Percentage of Impregnation of KMnO$_4$ and Presence of Fe$_2$O$_3$ in the Activated Vegetal Carbon (Impregnated in Polyester Fiber)

| Sample | Filter mass (g) | g/l of MnO$_4$ | g MnO$_4$ in 10 ml | g KMnO$_4$ in 45 ml | % impregnation KMnO$_4$ | sub sample 1 HCl/ KSCN | sub sample 2 H$_2$O/ KSCN |
|---|---|---|---|---|---|---|---|
| 1 | 1.49 | 0.39 | 0.0039 | 0.0176 | 1.18 | Positive | Negative |
| 2 | 1.54 | 0.46 | 0.0046 | 0.0207 | 1.34 | Positive | Negative |
| 3 | 1.45 | 0.38 | 0.0038 | 0.0171 | 1.18 | Positive | Negative |
| 4 | 1.52 | 0.51 | 0.0051 | 0.0230 | 1.51 | Positive | Negative |
| Average | 1.50 | 0.44 | 0.0044 | 0.0196 | 1.30 | | |

EXAMPLE 4

Impregnation of Activated Vegetal Carbon with Petrolatum, Permanganate of Potassium, and Iron (III) Oxide Using the same general procedure as in Example 3, but in this case, the aerosol is an emulsion of aqueous solution of permanganate of potassium and petrolatum in the form of very small droplets dispersed in the air. A characteristic of an aerosol is that when applied, they behave like aerosols for a while, but then become unbalanced. Also, like the prior example, the filter roll impregnated with activated vegetal carbon after reaction in the reactor turns into a dark green and brown coloration, typical of the presence of Mn (IV) oxide. This solid possesses predominantly hydrophobic character, which will favor interaction with the hydrophobic part of the emulsion, thereby avoiding direct contact between the aqueous phase with the activated vegetal carbon surface. That is, the permanganate of potassium will not be in direct contact with the activated vegetal carbon surface, so that they cannot react.

In the light of the results and to evaluate the potential influence of Mn (IV) oxide in the impregnation of permanganate in activated vegetal carbon, a variation was introduced. The variation consisted of contacting the filter material impregnated with activated vegetal carbon directly with the aerosol of permanganate of potassium solution and petrolatum. In this case, the result was a yellow colored filter material indicating the presence of Mn (IV), which suggests that the formation of Mn (IV) oxide may be relevant to the present teachings.

In Table 3, the impregnation of permanganate of potassium in the activated vegetal carbon is remarkably improved, reaching values close to about 22%. As in Example 3, the permanganate of potassium and iron (III) oxide was analyzed in the same way. The positive results for the sub samples with HCl/KSCN and negative results for $H_2O$/KSCN, confirm that Fe (III) oxide is present. (It is important to note that the impregnation was made only once for each face, hence it is believed that the loading of more permanganate is possible.)

Thus, it may be that $MnO_2$ formation can influence the activated vegetal carbon surface to adopt a positive charge in an aqueous solution. This fact is favored by the high dispersion grade generated on a surface activated vegetal carbon.

Also, $MnO_2$ is hydrophobic and can be adsorbed on the activated vegetal carbon surface. Consequently, the $MnO_2$ can be united with the hydrophobic part of the emulsion, avoiding the reaction of activated vegetal carbon with the aqueous solution of permanganate of potassium and be impregnated in the hydrophobic phase of the activated vegetal carbon surface.

A test was made to confirm the above. One band of 20 mm×150 mm samples were placed into water and observed. After a couple of seconds, the $KMnO_4$ diffused from the filter surface towards the liquid. Then, it was washed with water to eliminate all the permanganate. Once achieved, a 1% chloride acid solution was added until the water tested negative for thiocyanate of potassium.

After, supernatant was filtered and washed with water again, and 1% oxalic acid was added. The water sample turned into brown yellow, which disappeared after some time. This study is positive for $MnO_2$. Accordingly, in the adsorbent composition, $MnO_2$, $Fe_2O_3$, petrolatum, and $KMnO_4$ are present.

TABLE 3

Percentage of Impregnation of $KMnO_4$ and Presence of $Fe_2O_3$ in the Activated Vegetal Carbon (Impregnated in Polyester Fiber)

| Sample | Filer Mass (g) | g/l of $MnO_4$ | g $MnO_4$ in 10 cc | g $KMnO_4$ in 45 ml | % Impregnation $KMnO_4$ | sub sample 1 HCl/ KSCN | sub sample 2 H2O/ KSCN |
|---|---|---|---|---|---|---|---|
| 1 | 1.85 | 8.25 | 0.0825 | 0.3713 | 20.07 | Positive | Negative |
| 2 | 1.88 | 9.12 | 0.0912 | 0.4104 | 21.83 | Positive | Negative |
| 3 | 1.90 | 8.85 | 0.0885 | 0.3983 | 20.96 | Positive | Negative |
| 4 | 1.78 | 9.55 | 0.0955 | 0.4298 | 24.14 | Positive | Negative |
| Average | 1.50 | 8.94 | 0.0894 | 0.4024 | 21.75 | | |

Variations, modifications, and other implementations of what is described herein will occur to those of ordinary skill in the art without departing from the spirit and the essential characteristics of the present teachings. Accordingly, the scope of the present invention is to be defined not by the preceding illustrative description but instead by the following claims, and all changes that come within the meaning and range of equivalency of the claims are intended to be embraced therein.

What is claimed is:

1. An adsorbent composition comprising:
   an activated carbon impregnated with at least:
   a long chain saturated aliphatic hydrocarbon,
   a salt of permanganate, and
   iron (III) oxide,
   wherein the activated carbon is derived from a vegetal source and the salt of permanganate is present in an amount greater than 25 wt % of the total weight of the absorbent composition.

2. The adsorbent composition of claim 1, wherein the salt of permanganate is selected from potassium permanganate, sodium permanganate, lithium permanganate, and combinations thereof.

3. The adsorbent composition of claim 1, wherein the vegetal source is coconut shells.

4. The adsorbent composition of claim 1, wherein the long chain saturated aliphatic hydrocarbon is present in an amount at least about 0.3 wt % of the total weight of the adsorbent composition.

5. The adsorbent composition of claim 1, wherein the long chain saturated aliphatic hydrocarbon is petrolatum.

6. The adsorbent composition of claim 1, wherein a filter material is impregnated with the activated carbon.

7. The adsorbent composition of claim 6, wherein the filter material comprises polyester.

8. An article of manufacture comprising the adsorbent composition of claim 7.

9. An article of manufacture comprising the adsorbent composition of claim 6.

10. An article of manufacture comprising the adsorbent composition of claim 1.

11. A method of making an adsorbent composition, the method comprising:
   adding an acidic solution of a salt of permanganate to a filter material impregnated with an activated carbon derived from a vegetal source;
   adding an aqueous mixture of an iron salt;
   drying the filter material comprising the activated carbon and the product(s) of contacting the activated carbon with the salt of permanganate and the iron salt;
   contacting the dried filter material with an emulsion of an aqueous solution of a salt of permanganate and a long chain saturated aliphatic hydrocarbon; and drying the resulting filter material to provide an adsorbent composition comprising an activated carbon impregnated with at least a long chain saturated aliphatic hydrocarbon, permanganate, and iron (III) oxide, wherein the activated carbon is derived from a vegetal source.

12. The method of claim 11, wherein contacting the dried filter material with an emulsion comprises spraying the emulsion.

13. The method of claim 11, wherein drying the resulting filter material comprises using infrared radiation.

14. The method of claim 11, wherein the iron salt is an iron (II) salt.

15. The method of claim 11, wherein the iron salt is iron sulfate.

16. The method of claim 11, wherein the filter material comprises polyester.

17. The method of claim 11, wherein the vegetal source comprises coconut shells.

18. The method of claim 11, wherein the long chain saturated aliphatic hydrocarbon is selected from petrolatum, mineral oil, and combinations thereof.

19. The method of claim 11, wherein the salt of permanganate is selected from potassium permanganate, sodium permanganate, lithium permanganate, and combinations thereof.

20. The method of claim 11, wherein the adsorbent composition is placed into a container, optionally a porous container.

* * * * *